United States Patent Office 3,634,447
Patented Jan. 11, 1972

---

3,634,447
SUBSTITUTED NITROIMIDAZOLES AND METHOD OF PREPARING THE SAME
William Henry Gastrock, Hightstown, N.J., assignor to American Cyanamid Company, Stamford, Conn.
No Drawing. Filed Oct. 8, 1969, Ser. No. 864,861
Int. Cl. C07d 49/36
U.S. Cl. 260—309
7 Claims

ABSTRACT OF THE DISCLOSURE

This invention relates to the novel 1-benzoyloximino-1 - (1-substituted-5-nitro-2-imidazoly)-2-phenyl-glyoxals, a method for the preparation thereof and the use of such compounds as intermediates in the preparation of the antibacterial and antiprotozoal compounds 2-amino-5-(5-nitro-1-substituted-2-imidazolyl)-1,3,4-thiadiazoles.

SUMMARY OF THE INVENTION

The present invention is particularly directed to new 1 - benzoyloximino - 1 - (1-substituted-5-nitro-2-imidazolyl)-2-phenylglyoxal compounds having the formula:

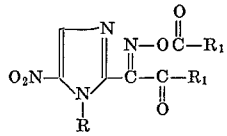

wherein R is lower alkly, loweralkanoyloxyloweralkyl or aroyloxyloweralkyl and $R_1$ is phenyl, monohalophenyl, dihalophenyl, loweralkylphenyl, diloweralkylphenyl, 4-nitrophenyl, methoxyphenyl or naphthyl. The term "loweralkyl" and "loweralkanoyl," as used throughout this specification and appended claims, is intended to mean straight and branched chain alkyl groups or alkanoyl groups having from 1 to 4 carbon atoms. The term "aroyl" is intended to include benzoyl, monohalobenzoyl, dihalobenzoyl, loweralkylbenzoyl, diloweralkylbenzoyl, 4-nitrobenzoyl, methoxybenzoyl and naphthoyl. The term "halo" is intended to include fluorine, chlorine, bromine and iodine and "dihalophenyl" describes a phenyl substituted with two halogens which are either the same or different. Similarly, the term "diloweralkylphenyl" describes a phenyl substituted with two identical or different alkyl groups, either straight or branched chain and having from 1 to 4 carbon atoms. This invention is also concerned with a novel method for the preparation of the above compounds and the use of such compounds as antibacterial agents or as intermediates in the preparation of the 2 - amino - 5-(5-nitro-1-substituted-2-imidazolyl)-1,3,4-thiadiazoles which are highly effective antibacterial and antiprotozoal agents.

In regard to the new compounds of the present invention (i.e., 1 - benzoyloximino - 1 - (1-substituted-5-nitro-2-imidazolyl)-2-phenylglyoxals) having the formula:

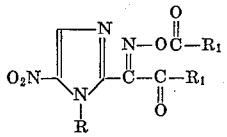

wherein R and $R_1$ are defined above, it is pointed out that where $R_1$ is monohalophenyl or loweralkylphenyl the halogen or alkyl may be in the ortho, meta or para positions and the preferred substituents are chloro and bromo for the halo group and methyl, ethyl or isopropyl for the loweralkyl group. Where $R_1$ is dihalophenyl or diloweralkylphenyl and substituents may be located in any two of the 2,3,4,5 or 6-position on the phenyl ring and the halogens or loweralkyl substituents may be the same or different. The preferred dihalophenyl groups are the dichloro, dibromo and the chlorobromophenyl groups such as, 2,3-dichlorophenyl; 3,4-dichlorophenyl; 3,5-dichlorophenyl, 2,6-dibromophenyl; 3,5-dibromophenyl; 2-chloro-3-bromophenyl; 3-chloro-5-phenyl and 3-bromo-4-chlorophenyl. The preferred diloweralkylphenyl group are the 3,4 - dimethylphenyl; 3,5 - dimethylphenyl; 2,6-diethyphenyl; 2,3 - diethylphenyl; 3-isopropyl-4-methylphenyl; 3 - isopropyl - 5 - methylphenyl; the 3,5-diisopropylphenyl and the 3,4-diisopropylphenyl.

These compounds may be prepared by reacting a 1-substituted - 5 - nitro-α-phenyl-2-imidazoleethenolbenzoate of the formula

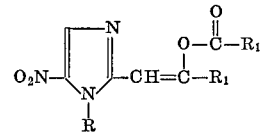

wherein R and $R_1$ are as defined above, with at least about 1 mole equivalent of a nitrosating agent selected from the group consisting of nitrosyl chloride, nitrosyl bisulfate, nitrogen dioxide or tetroxide, nitrogen trioxide and nitrogen pentoxide. The reaction may be conducted at atmospheric or superatmospheric pressure over a temperature range of from about 0° C. to 100° C. and is preferably conducted at a temperature between about 20° C. and 80° C. The reaction generally requires from about 10 minutes to 4 hours for completion but this time may be extended to about 24 hours if desired. In most instance it is generally expedient to conduct these reactions at atmospheric pressure; however, when desirable to do so, such reactions may be conducted under several atmospheres of pressure generally not exceeding about 10 atmospheres. It is usually also found to be most practicable to conduct these reactions employing an excess of nitrosating agent. A slight excess is generally sufficient to give optimum product yields but on occasion it may be desirable to employ a large excess of nitrosating agent, for example, 2 or 3 mole equivalents of nitrosating agent per mole of imidazoleethanol benzoate. Even larger excesses of nitrosating agent (i.e., as much as 10 mole equivalents per mole of imidazoleethanol benzoate) may be used in these reactions but usually there is little if any further improvement in product yield obtained over that obtained with a 2 or 3 mole equivalent excess.

It has also been found that this reaction can advantageously be conducted in the presence of an alkali metal salt of an organic acid such as sodium or potassium acetate, propionate, butyrate or the like. Usually, such salt when present are used in approximately equimolar amounts with the nitrosating agent. However, greater or lesser amounts may be employed, for example, from about 0.5 to 2 mole equivalents of acid salt may be used per mole of nitrosating agent. It has further been discovered that this process may, advantageously, be conducted in the presence of an organic solvent inert with respect to the reactants and the chemical reaction. Among the solvents suitable for this purpose are the monocyclic hydrocarbons such as toluene and benzene, the chlorinated hydrocarbons such as methylene chloride or ethylene chloride, also acetonitrile and nitromethane.

The starting materials (i.e., the 1-substituted-5-nitro-α-phenyl-2-imidazoleethenol benzoates) for these reactions are obtained from 1-loweralkyl-, 1-hydroxyloweralkyl-, 1-loweralkanoyloxyloweralkyl-, or 1-aroyloxyloweralkyl-2-methyl-5-nitroimidazoles by reaction with from 2 to 8 moles of an acid halide at a temperature of about 25° C. to 125° C. for 3 to 24 hours in an inert solvent in the presence of a tertiary amine such as, for example, triethylamine or diisopropylethylamine. Acid halides found useful in the reaction may be, for example, benzoyl chloride, halobenzoyl chloride, dihalobenzoyl chlorides, lower alkylbenzoyl chlorides, dilower alkyl benzoyl chlorides, p-nitrobenzoyl chloride, naphthoyl chloride, or benzoyl bromide. Solvents such as tetrahydrofuran, diglyme, toluene, and the like can be used.

A sufficient quantity of a tertiary amine such as diisopropylethylamine is used both to catalyze the reaction and to react with the hydrogen halide liberated. For example, refluxing 0.2 mole of 1,2-dimethyl-5-nitroimidazole and 0.6 mole of benzoyl chloride in 125 ml. of diisopropylethylamine and 75 ml. of dioxane for 18 hours gives 1-methyl-5-nitro-α-phenyl-2-imidazoleethenol benzoate in high yield.

The reaction may be illustrated as follows:

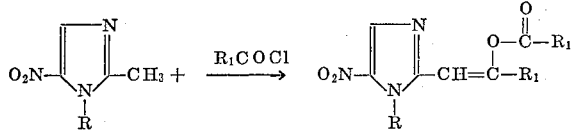

wherein R and $R_1$ are as previously defined.

As previously indicated, the compounds of the present invention are useful as antibacterial agents. In particular, they are effective in chickens for the control of *Salmonella gallinarum* the causative agent of fowl typhoid when employed at the concentration of 0.1 to 0.75% administered in the feed and are also effective for controlling certain protozoal infections such as *Trichomonas vaginalis*. These compounds are also useful as intermediates in the preparation of the nitroimidazoles described in Berkelhammer et al., U.S. Pat. 3,452,035 issued June 24, 1969. These nitroimidazoles are shown to be highly effective antibacterial and antiprotozoal agents useful in the treatment of bacterial and protozoal infections in poultry and other domestic and farm animals.

The procedures which may be employed to obtain the nitroimidazoles of the above-mentioned patent are graphically illustrated in the flow diagram below.

FLOW DIAGRAM

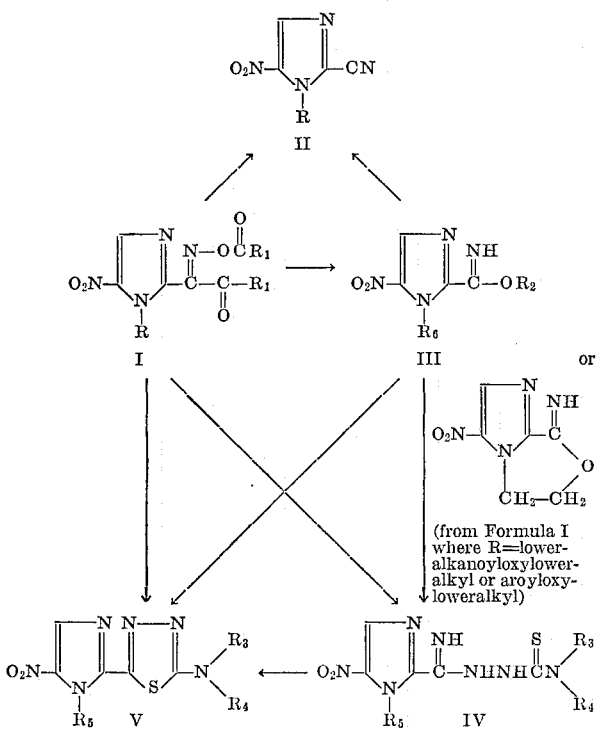

wherein R and $R_1$ are as previously described, $R_2$ is loweralkyl, $R_3$ and $R_4$ are hydrogen or loweralkyl, $R_5$ is loweralkyl or hydroxyloweralkyl and $R_6$ is loweralkyl.

In accordance with the present invention and by reference to the flow diagram above, phenylglyoxal of Formula I can be converted to the 2-cyano-1-substituted-5-nitroimidazole of Formula II by reaction thereof with 1 mole equivalent of a strong base, preferably an alkali metal hydroxide, cyanide or alkoxide such as sodium hydroxide, potassium hydroxide, potassium cyanide, sodium cyanide, potassium t-butoxide, sodium methoxide or sodium ethoxide, at a temperature between about 0° C. and 100° C. and preferably between about 20°–30° C. In practice it is usually also desirable to conduct this reaction in the presence of an organic solvent such as the loweralkyl alcohols having from 1 to 6 carbon atoms. While the above reaction is optimally run using 1 molar equivalent of base, it has been found that a lower ratio of base to phenylglyoxal yields a correspondingly lesser amount of the Formula II nitroimidazole.

When the Formula I compound is treated as described immediately above in an alcoholic solvent, but an excess of base is used over the 1 mole equivalent used to form the Formula II nitroimidazole, the reaction proceeds directly to the imidazolecarboximidate of Formula III. While only a catalytic amount of base in excess of the 1 mole equivalent is required for this reaction, 2 or even 3 mole equivalents of base may be employed. However, larger excesses of base appear to have no advantage in this process. In this reaction R is as described above and $R_2$ represents the alkyl group derived from the solvent employed.

Also, where R is acyloxy loweralkyl, the phenylglyoxal of the Formula I undergoes transesterification during the course of the reaction and is cyclized to the cyclic imidate of Formula III. As with the above reaction, the alkali metal hydroxides, cyanides, and alkoxides are preferred bases and the 1 to 6 carbon alcohols are preferred solvents.

The imidazolecarboximidates of Formula III are then readily converted to the imidazolecarboximidoyl thiosemicarbazides of Formula IV by reaction of the imidazolecarboximidate with approximately an equimolar amount of a thiosemicarbazide of the formula

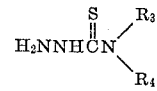

wherein $R_3$ and $R_4$ are hydrogen or loweralkyl and a catalytic or greater amount of an organic carboxylic acid such as acetic, benzoic, propionic, butyric or equivalent acid. The reaction may be run over a temperature range of about 0° C. to 100° C. and in the presence of an organic solvent such as defined above for the previous steps. Alternatively, a catalytic amount of a mineral or strong organic acid such as a sulfonic acid or trifluoro acetic acid may be used, providing the temperature is kept between 0° C. and about 30° C.

If this same reaction is run substituting a mineral acid such as hydrochloric, hydrobromic, sulfuric acid or the like or an organic acid such as a sulfonic acid or trifluoroacetic acid for the carboxylic acid, and the reaction mixture is heated to between about 45° C. and 150° C., the thiadiazoles of Formula V are obtained directly from the reaction mixture. Formula V compounds are useful as antibacterial or antiprotozoal agents in the treatment of domestic and farm animals. The imidazolecarboximidoyl thiosemicarbazides of Formula IV are also readily converted to the 2-amino-5-(5-nitro-1-substituted-2-imidazolyl)-1,3,4-thiadiazoles of Formula V by treatment thereof with a catalytic amount of a mineral acid or a sulfonic acid or a strong organic acid as mentioned above, and heating of the reaction mixture to between 45° C. and 150° C. Alternatively, the ring closure to the thiadiazole may be carried out in a strong liquid acid such as trifluoroacetic acid or hydrofluoric acid in the absence of an appreciable amount of added solvent at somewhat lower temperatures, for example 0° to 45° C.

While the Formulae III and IV compounds may be isolated from their separate reaction mixtures, it has been found that such products need not be isolated if one wishes simply to conduct the process in a stepwise manner adding the required reactants to the reaction mixture at the appropriate time following completion of the previous reaction.

By referring to the flow diagram it can be seen that the phenylglyoxal of Formula I can be converted to the thiadiazole of Formula V in a "telescoped process." This involves the steps of (1) treating the phenylglyoxal Formula I with at least 1 mole equivalent plus a catalytic amount and preferably 2 mole equivalents of a strong base selected from the group consisting of alkali metal hydroxide, alkali metal cyanides and alkali metal alkoxides, in the presence of a $C_1-C_6$ alcohol, (2) treating the thus formed mixture with a thiosemicarbazide, with a catalytic amount of an organic or mineral acid present, and (3) heating the thus formed reaction mixture with a catalytic amount of a strong mineral acid or a strong organic acid preferably selected from the group consisting of hydrohalic acids, sulfur containing mineral acids, sulfonic acid or trifluoroacetic acid. In step (2) above the thiosemicarbazide has the formula

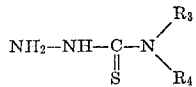

wherein $R_3$ and $R_4$ are hydrogen or loweralkyl $C_1-C_4$.

SPECIFIC DISCLOSURE

The following examples illustrate in detail the preparation of representative compounds of this invention.

EXAMPLE 1

Preparation of 1-benzoyloximino-1-[1-methyl-5-nitro-2-imidazolyl)-2-phenylglyoxal (A) A mixture of 28.7 g. (0.020 mole) of 1,2-dimethyl-5-nitroimidazole, 125 ml. of diisopropylethylamine, 75 ml. of dioxane and 70 ml. (84 g.; 0.60 mole) of benzoyl chloride, is refluxed for 18 hours. After standing and cooling to room temperature, 300 ml. of ether is added to the crystalline mass. The solid is broken up and filtered and washed with ether. The solid is washed with two 100-ml. portions of water and with ether to give 59 g. of 1-methyl-5-nitro-α-phenyl - 2 - imidazoleethenol benzoate, melting point 194°–198° C., raised to 205-207° C. by recrystallization.

(B) Trimethylamine, 33.8 g. (0.573 mole), is dissolved in 120 ml. toluene. This solution is mixed with 20 g. (0.1415 mole) 1,2-dimethyl-5-nitroimidazole and 41 ml. (0.3540 mole) of benzoyl chloride. The mixture is mechanically stirred overnight at about room temperature. The resulting bright yellow precipitate is filtered, mixed with 50 ml. water, washed three times with a total of 150 ml. water and dried in a hot air oven to constant weight. There is obtained 47.7 g. (97%) of same product as A above, melting point 200 to 202° C., and 205–207° C. after recrystallization.

Other compounds which are prepared according to the above-described procedure are, for example, 1-methyl-5-nitro-α-(4-chlorophenyl) - 2 - imidazoleethenol 4-chlorobenzoate; 1-methyl - 5 - nitro - α - (2,4 - dichlorophenyl)-2-imidazoleethenol 2,4-dichlorobenzoate, and 1-methyl-5-nitro - α - (2,4,6 - tribromophenyl) - 2 - imidazoleethenol 2,4,6-tribromobenzoate.

To a mechanically stirred mixture of 1-methyl-5-nitro-α-phenyl-2-imidazoleethenol benzoate (7.0 g., 0.02 mole) and 30 ml. of acetonitrile cooled to 6° C. is added liquid dinitrogen tetroxide (2.76 g., 1.9 ml., 0.03 mole) and the mixture is stirred at room temperature for 20 hours. The solid is filtered, washed with acetonitrile and dried, affording 2.59 g. of the benzoyloxime, melting point 147°–150° C. The filtrate is concentrated, diluted with water and adjusted to pH 8 with 10% sodium bicarbonate solution. The solid is filtered, washed and dried yielding an additional 4.38 g. of product, melting point 146°–150° C.

The above procedure, using dichloroethane or toluene as solvent, also gives 1-benzoyloximino-1-(1-methyl-5-nitro-2-imidazolyl)-2-phenylglyoxal.

EXAMPLE 2

Preparation of 1-benzoyloximino-1-(1methyl-5-nitro-2-imidazolyl)-2-phenylglyoxal To a magnetically stirred mixture of 1-methyl-5-nitro-α-phenyl-2-imidazoleethanol benzoate (17.5 g., 0.05 mole) and 200 ml. of nitromethane (dried over molecular sieves), cooled to 5° C., is added liquid dinitrogen tetroxide (6.9 g., 4.8 ml., 0.075 mole). The mixture is stirred at room temperature for 4 hours and the excess dinitrogen tetroxide is removed under a stream of air. The yellow solution is evaporated to dryness and the residue is slurried with cold 10% sodium bicarbonate solution. The tan solid is filtered and washed with water, affording 19.2 g. of the title compound, melting point 143°–147° C. A sample is recrystallized from benzene-heptane affording pure product, melting point 149°–151° C.

When the two phenyl groups in the starting material are replaced by 4-chlorophenyl; 2,4-dichlorophenyl; 4-nitrophenyl; 4-tolyl; 2,4-xylyl; 2,4-dimethoxyphenyl; or α-naphthyl, there is obtained by use of the above procedure 1-(4-chlorobenzoyl)oximino-1-(1-methyl-5-nitro-2-imidazolyl)-2-(4-chlorophenyl)glyoxal;
1-(2,4-dichlorobenzoyl)oximino-1-(1-methyl-5-nitro-2-imidazolyl)-2-(2,4-dichlorophenyl)glyoxal;
1-(4-nitrobenzoyl)oximino-1-(1-methyl-5-nitro-2-imidazolyl)-2-(4-nitrophenyl)glyoxal;
1-(4-toluyl)oximino-1-(1-methyl-5-nitro-2-imidazolyl)-2-(4-tolyl)glyoxal;
1-(2,4-xyloyl)oximino-1-(1-methyl-5-nitro-2-imidazolyl)-2-(2,4-xylyl)glyoxal;
1-(2,4-dimethoxybenzoyl)oximino-1-(1-methyl-5-nitro-2-imidazolyl)-2-(2,4-dimethoxyphenyl)glyoxal; and
1-(α-naphthoyl)oximino-1-(methyl-5-nitro-2-imidazolyl)-2-(α-naphthyl)glyoxal respectively.

EXAMPLE 3

Preparation of 1-benzoyloximino-1-(1-methyl-5-nitro-2-imidazolyl)-2-phenylglyoxal To a mechanically stirred mixture of 1-methyl-5-nitro-α-phenyl-2-imidazoleethanol benzoate (1.75 g., 0.005 mole) and 50 ml. of nitromethane cooled to 5° C. is added liquid nitrogen trioxide (1.3 g., 0.9 ml., 0.017 mole). The mixture is stirred at room temperature for 4½ hours and the excess nitrogen trioxide is evaporated under a stream of air. The solution is evaporated to dryness and the residue is slurried with cold water and made alkaline with cold 10% sodium bicarbonate solution. The solid is filtered, washed, and dried, affording 1.72 g. of the benzoyloxime. Recrystallization from benzene-heptane gives product with melting point 149°–151° C.

EXAMPLE 4

Preparation of 1-benzoyloximino-1-(1-methyl-5-nitro-2-imidazolyl)-2-phenylglyoxal To a mechanically stirred slurry of sodium acetate (0.82 g., 0.01 mole) in 50 ml. of nitromethane cooled to 5° C. is added liquid dinitrogen tetroxide (0.92 g., 0.64 ml., 0.01 mole) and the mixture is stirred at room temperature for 1¼ hours. To the mixture is added 1-methyl-5-nitro-α-phenyl-2-imidazoleethanol benzoate (1.75 g., 0.005 mole) and the mixture is stirred at room temperature for 2 hours. The white solid is filtered and washed with nitromethane, affording 0.824 g. of sodium nitrate. The filtrate is evaporated to dryness and the residue is slurried with water and 10% sodium bicarbonate solution. The solid is filtered, washed and dried affording 1.867 g. of the benzoyloxime, described above, melting point 141°–146° C.

EXAMPLE 5

Preparation of 1-benzoyloximino-1-(1-methyl-5-nitro-2-imidazolyl)-2-phenylglyoxal Nitrosyl chloride is bubbled into a magnetically stirred solution of 1-methyl-5-nitro-α-phenyl-2-imidazoleethanol benzoate (1.75 g., 0.005 mole) in 50 ml. of dry benzene for 1½ hours at room temperature and for 1½ hours at 70°–80° C. The reaction mixture is cooled and the excess nitrosyl chloride is evaporated under a stream of air. The reaction mixture is evaporated to dryness and the residue is slurried with heptanebenzene (5:1) and cooled in an ice bath. The solid is filtered affording 1.12 g. of white solid. Recrystallization from benzene heptane affords 0.85 g. of the benzoyloxime, melting point 149°–151° C.

EXAMPLE 6

Preparation of 2-cyano-1-methyl-5-nitroimidazole

A mixture of 1-methyl-5-nitro-α-phenyl-2-imidazoleethanol benzoate (1.75 g., 0.005 mole) and 50 ml. of dry benzene is stirred and heated to reflux and nitrosyl chloride is bubbled into the refluxing solution for 1 hour. The reaction mixture is cooled and evaporated to dryness, affording an oil. The residue is slurried with ether-hexane (1:1) and several ml. of ethanol is added along with 10% sodium bicarbonate solution. The mixture is stirred for 2 hours, and the solid is filtered, washed and dried, affording 0.20 g. of 1-benzoyloximino-1-(1-methyl-5-nitro-2-imidazolyl)-2-phenylglyoxal. The filtrate is concentrated and extracted with carbon tetrachloride. The aqueous layer is extracted with chloroform and the extracts are evaporated to dryness, affording the above compound identified by comparison of the infrared spectrum with that of an authentic sample.

EXAMPLE 7

Preparation of 1-benzoyloximino-1-(1-ethyl-5-nitro-2-imidazolyl)-2-phenylglyoxal To a stirred solution of 1-ethyl-5-nitro-α-phenyl-2-imidazoleethenol benzoate (0.90 g., 0.002 mole) in 25 ml. of dry nitromethane is added liquid dinitrogen tetroxide (0.46 g., 0.31 ml. 0.005 mole) and the solution is stirred at room temperature for 3½ hours. The excess dinitrogen tetroxide is evaporated under a stream of air and the reaction mixture is evaporated to dryness. The oily residue is treated with 50 ml. of water and made alkaline with a saturated sodium bicarbonate solution. The mixture is cooled and the solid is filtered, washed and dried affording 0.89 g. of crude product, melting point 126°–144° C. The solid is recrystallized from benzene-heptane affording 0.64 g. of pure title compound, melting point 149°–151° C.

EXAMPLE 8

Preparation of 1-benzoyloximino-1-[1-(2-benzoyloxyethyl)-5-nitro-2-imidazolyl]-2-phenylglyoxal To a stirred mixture of 1-(2-benzoyloxyethyl)-5-nitro-α-phenyl-2-imidazoleethenol benzoate (2.42 g., 0.005 mole) and 50 ml. of dry nitromethane cooled to 10° C. is added liquid dinitrogen tetroxide, and the mixture is stirred at room temperature for 4½ hours. The excess dinitrogen tetroxide is evaporated under a stream of air and the reaction mixture is evaporated to dryness. The oily residue is slurried with 50 ml. of water and made alkaline with 10% sodium bicarbonate solution. The solid is filtered, washed and dried affording 2.53 g. of crude product. The solid is recrystallized from benzene-heptane to give 1.98 g. of pure title compound, melting point 127–129° C.

In a similar manner 1 - benzoyloximino - 1 - [1-(2-acetoxy-ethyl) - 5 - nitro - 2 - imidazolyl] - 2 - phenylglyoxal is prepared from 1 - (2 - acetoxyethyl) - 5 - nitro-α-phenyl - 2 - imidazoleethenol benzoate.

EXAMPLE 9

Preparation of 1-benzoyloximino-1-(1-methyl-5-nitro-2-imidazolyl)-2-phenylglyoxal To a mixture of 7.3 g. of nitrosylsulfuric acid in 30 ml. of dry acetonitrile chilled in an ice bath is added 7.0 g. (0.020 mole) of 1 - methyl - 5 - nitro - α - phenyl-2-imidazoleethanol benzoate. The mixture is chilled for 15 minutes and stirred at room temperature for 17 hours. The mixture is poured onto ice and made basic with saturated sodium bicarbonate solution. Filtration gives 6.6 g. of yellow crystals. Purification gives the product 1 - (1 - methyl - 5 - nitro - 2 - imidazolyl) - 2 - phenylglyoxal 1-(o-benzoyloxime) as pale yellow crystals, melting point 148°–151° C.

EXAMPLE 10

Preparation of 2-cyano-1-methyl-5-nitroimidazole

To a magnetically stirred mixture of potassium cyanide (0.326 g., 0.005 mole) and 50 ml. of absolute ethanol is added 1 - benzoyloximino - 1 - (1 - methyl - 5 - nitro-2 - imidazolyl) - 2 - phenylglyoxal (1.90 g., 0.005 mole). The resulting mixture is stirred at room temperature for 110 minutes and the solid is filtered. The filtrate is evaporated to dryness and the residue is slurried with 50 ml. of heptane and the resultant solid is filtered, washed with heptane, then slurried with water and extracted with chloroform. The chloroform extracts, upon evaporation, yield 0.64 g. of oil, which solidifies on cooling. The product melts at 76°–86° C. and has an infrared spectrum identical to authentic 1-methyl-5-nitroimidazole-2-carbonitrile.

In a similar manner, 2-cyano-1-ethyl-5-nitroimidazole, 1 - (2 - acetoxyethyl) - 2 - cyano - 5 - nitroimidazole and 1 - (2 - benzoyloxyethyl) - 2 - cyano - 5 - nitroimidazole are prepared from 1 - benzoyloximino - 1 - (1 - ethyl-5-nitro - 2 - imidazolyl) - 2 - phenylglyoxal, 1 - benzoyloximino - 1 - [1 - (2 - acetoxyethyl) - 5 - nitro - 2 - imidazolyl] - 2 - phenylglyoxal and 1 - benzoyloximino - 1 - [1-(2 - benzoyloxyethyl) - 5 - nitro - 2 - imidazolyl]-2-phenylglyoxal, respectively.

According to the above procedure, 2-cyano-1-methyl-5-nitroimidazole is prepared from 1-benzoyloximino-1-(1-methyl - 5 - nitro - 2 - imidazolyl) - 2 - phenylglyoxal by replacing the potassium cyanide in ethanol with an equimolar amount of sodium methoxide in methanol.

EXAMPLE 11

Preparation of ethyl 1-methyl-5-nitro-2-imidazolecarboximidate

To a magnetically stirred solution of potassium t-butoxide (0.62 g., 0.0055 mole) in 50 ml. of absolute ethanol is added 1-benzoyloximino-1-(1-methyl-5-nitro-2-imidazolyl)-2-phenylglyoxal (1.90 g., 0.005 mole) and the mixture is stirred at room temperature for 30 minutes. Additional potassium t-butoxide is aded to make the mixture alkaline to pH paper. The mixture is stirred for an additional 3 hours and the solid is filtered and discarded. The filtrate is evaporated to dryness and the residue is washed with 125 ml. of hot heptane. The heptane solution is concentrated and cooled in an ice bath. The resulting pale yellow needles are filtered, affording 0.69 g. of ethyl imidate, melting point 72°–79° C.

The ethyl imidate is also obtained from 1-benzoyloximino - 1 - (1 - methyl - 5 - nitro-2-imidazolyl)-2-phenylglyoxal with 2 mole of potassium cyanide in ethanol for each mole of 1 - benzoyloximino - 1 - (1 - methyl-5-nitro - 2 - imidazolyl) - 2 - phenylglyoxal.

According to the above procedure, ethyl 1-ethyl-5-nitroimidazole - 2 - carboximidate is prepared from 1-benzoyloximino - 1 - (1 - ethyl - 5 - nitro - 2 - imidazolyl)-2-phenylglyoxal.

In a similar manner 1 - (2 - hydroxyethyl) - 5 - nitro-2 - imidazolecarboximidic acid delta-lactone is prepared from both 1 - benzoyloximino - 1 - [1 - acetoxyethyl)-

5 - nitro - 2 - imidazolyl] - 2 - phenylglyoxal and 1-benzoyloximino - 1 - [1 - (2 - benzoyloxyethyl) - 5 - nitro-2-imidazolyl]-2-phenylglyoxal.

In a similar manner, methyl 1-methyl-5-nitro-2-imidazolecarboximidate is prepared from 1 - benzoyloximino-1-(1 - methyl - 5 - nitro - 2 - imidazolyl) - 2 - phenylglyoxal by replacing the potassium t-butoxide in ethanol by an equimolar amount of sodium methoxide in methanol.

EXAMPLE 12

Preparation of 1-(1-methyl-5-nitro-2-imidazolecarboximidoyl)-3-thiosemicarbazide To a mechanically stirred solution of sodium methoxide (0.594 g., 0.011 mole) in 20 ml. of methanol is added 1 - benzoyloximino - 1 - (1 - methyl - 5 - nitro - 2 - imidazolyl) - 2 - phenylglyoxal (3.78 g., 0.01 mole). A temperature of 23°–25° C. is maintained during the addition. Additional sodium methoxide is added to give pH 10 and the mixture is stirred at room temperature for 2½ hours. To this solution of methyl 1 - methyl - 5 - nitro-2-imidazolecarboximidate, thiosemicarbazide (0.91 g., 0.01 mole) and 1 ml. of glacial acetic acid are added and the yellow mixture is stirred at room temperature for 3 hours. The reaction mixture is cooled and the red-orange solid is filtered and dried, affording 1.87 g. of the title compound, melting point 196°–206° C. Recrystallization from ethanol-dimethyl formamide gives pure product, melting point 208°–210° C. with decomposition.

The title compound is also obtained when the above procedure is used with the execption that the following compounds are substituted for the 1-benzoyloximino-1-(1-methyl-5-nitro-2-imidazolyl)-2-phenylglyoxal; namely, 1-(4-chlorobenzoyl)oximino-1-(1-methyl-5-nitro-2-imidazolyl)-2-(4-chlorophenyl)glyoxal;
1-(2,4-dichlorobenzoyl)oximino-1-(1-methyl-5-nitro-2-imidazolyl)-2-(2,4-dichlorophenyl)glyoxal;
1-(4-nitrobenzoyl)oximino-1-(1-methyl-5-nitro-2-imidazolyl)-2-(4-nitrophenyl)glyoxal;
1-(4-toloyl)oximino-1-(1-methyl-5-nitro-2-imidazolyl)-2-(4-toluyl)-glyoxal;
1-(2,4-xyloyl)oximino-1-(1-methyl-5-nitro-2-imidazolyl)-2-(2,4-xylyl)glyoxal;
1-(2,4-dimethoxybenzoyl)oximino-1-(1-methyl-5-nitro-2-imidazolyl)-2-(2,4-dimethoxyphenyl)glyoxal; and
1-(α-naphthoyl)oximino-1-(1-methyl-5-nitro-2-imidazolyl)-2-(α-naphthyl)glyoxal.

By the above procedure, 1 - (1 - methyl - 5 - nitro-2-imidazolecarboximidoyl) - 4 - methyl - 3 - thiosemicarbazide and 1 - (1 - methyl - 5 - nitro - 2 - imidazolecarboximidoyl - 4,4 - dimethyl - 3 - thiosemicarbazide are obtained by replacing thiosemicarbazide with 4-methyl - 3 - thiosemicarbazide and 4,4 - dimethyl-3-thiosemicarbazide; respectively.

EXAMPLE 13

Preparation of 1-[1-(2-hydroxyethyl)-5-nitro-2-imidazolecarboximidoyl]-3-thiosemicarbazide To a stirred solution of sodium methoxide (0.13 g., 0.0024 mole) in 25 ml. of methanol is added 1-benzoyloximino - 1 - [1 - (2 - benzoyloxyethyl) - 5 - nitro - 2-imidazolyl] - 2 - phenylglyoxal (1.024 g., 0.002 mole) and the solution is stirred at room temperature for 2½ hours. Thiosemicarbazide (0.182 g., 0.002 mole) and 1 ml. of glacial acetic acid are added and the mixture is stirred at room temperature for 18 hours. The reaction is cooled in an ice bath and the solid is filtered, washed and dried to give 0.478 g. of the title compound, melting point 200° C., dec.

The title compound is also prepared from 1-benzoyloximino - [1 - (2 - acetoxyethyl) - 5 - nitro-2-imidazoyl]-2-phenylglyoxal, using the above procedure.

EXAMPLE 14

Preparation of 1-(1-ethyl-5-nitro-2-imidazolecarboximidoyl)-3-thiosemicarbazide

A solution of sodium methoxide (0.060 g., 0.001 mole) and 1 - benzoyloximino - 1 - (1 - ethyl - 5 - nitro - 2-imidazolyl) - 2 - phenylglyoxal (0.392 g., 0.001 mole) in 25 ml. of methanol is stirred at room temperature for 2¼ hours. Thiosemicarbazide (0.091 g., 0.001 mole) and 1 ml. of glacial acetic acid are added and the solution is stirred for 18 hours at room temperature. The reaction mixture is diluted with water and concentrated. The yellow solid is filtered and washed with water. The solid is recrystallized from water and from ethyl acetate-heptane to give 0.065 g. of the title compound, melting point 227°–229° C., dec.

EXAMPLE 15

Preparation of 2-amino-5-(1-methyl-5-nitro-2-imidazolyl)-1,3,4-thiadiazole from 1-benzoyloximino-1-(1-methyl-5-nitro-2-imidazolyl)-2-phenylglyoxal To a mechanically stirred mixture of sodium methoxide (0.65 g., 0.012 mole) in 20 ml. of methanol maintained at 25–30° C. is added 1 - benzoyloximino - 1 - (1-methyl-5-nitro-2-imidazolyl)-2-phenylglyoxal (3.78 g., 0.01 mole). The mixture is stirred at room temperature for 2½ hours. Thiosemicarbazide (0.91 g., 0.01 mole) and 1 ml. of glacial acetic acid are added and the mixture is stirred at room temperature for 2½ hours. Concentrated hydrochloric acid (2 ml.) is then added and the mixture is heated. After 25 minutes (60° C.) and 35 minutes (65° C.) additional 1 ml. portions of concentrated hydrochloric acid are added and the mixture is heated for 25 minutes longer. The reaction mixture is made alkaline with concentrated ammonium hydroxide and the solid is filtered and washed with water, affording 1.28 g. of the title compound, melting point 262°–264° C.

By the above procedure, 2 - amino - 5 - (1 - ethyl - 5-nitro - 2 - imidazolyl) - 1,3,4 - thiadiazole is prepared from 1 - benzoyloximino - 1 - (1 - ethyl - 5 - nitro - 2-imidazolyl) - 2 - phenylglyoxal.

In a similar manner, 2 - amino - 5 - [1 - (2 - hydroxyethyl) - 5 - nitro - 2 - imidazolyl] - 1,3,4 - thiadiazole is prepared from both 1 - benzoyloximino - 1 - [(2 - acetoxyethyl) - 5 - nitro - 2 - imidazolyl] - 2 - phenylglyoxal and 1 - benzoyloximino - 1 - [1-(2-benzoyloxyethyl)-5-nitro-2 - imidazolyl] - 2 - phenylglyoxal.

According to the above procedure, 2 - methylamino - 5-(1 - methyl - 5 - nitro - 2 - imidazolyl) - 1,3,4 - thiadiazole and 2 - dimethylamino - 5 - (1 - methyl - 5 - nitro - 2-imidazole) - 1,3,4 - thiadiazole are prepared by replacing the thiosemicarbazide with 4-methyl-3-thiosemicarbazide and 4,4 - dimethyl - 3 - thiosemicarbazide, respectively.

EXAMPLE 16

Preparation of 2 - amino - 5 - (1 - methyl - 5 - nitro - 2-imidazolyl) - 1,3,4 - thiadiazole from ethyl 1 - methyl-5 - nitro - 2 - imidazolecarboximidate To a stirred solution of ethyl 1 - methyl - 5 - nitro - 2-imidazolecarboximidate (0.198 g., 0.001 mole) in 10 ml. of absolute ethanol is added thiosemicarbazide (0.091 g., 0.001 mole) and 20 drops of conc. hydrochloric acid. The solution is heated at reflux for 30 minutes and diluted with water. The aqueous solution is made alkaline with saturated sodium carbonate solution and the solid is filtered, washed with dried, affording 0.023 g. of the title compound, melting point 262°–264° C., dec.

In a similar manner, using methyl 1 - methyl - 5 - nitro-2 - imidazolecarboximidate, in place of ethyl 1 - methyl-5 - nitro - 2 - imidazolecarboximidate, also yields the title compound.

By the above procedure ethyl 1 - ethyl - 5 - nitro - 2-imidazolecarboximidate and 1 - (2 - hydroxyethyl) - 5-nitro - 2 - imidazolecarboximidic acid delta-lactone yield 2 - amino - 5 - (1 - ethyl - 5 - nitro - 2 - imidazolyl)-1,3,4 - thiadiazole and 2 - amino - 5 - [1 - (2 - hydroxyethyl) - 5 - nitro - 2 - imidazolyl] - 1,3,4 - thiadiazole, respectively.

EXAMPLE 17

Preparation of 2-amino-5-(1-methyl-5-nitro-2-imidazolyl)-1,3,4-thiadiazole

To a stirred mixture of 1-(1-methyl - 5 - nitro-2-imidazolecarboximidoyl) - 3 - thiosemicarbazide (0.486 g., 0.002 mole) and 5 ml. of methanol is added 1 ml. of saturated ethanolic HCl and the mixture is heated at reflux for 1 hour. The reaction mixture is diluted with 5 ml. of water and is made alkaline with conc. ammonium hydroxide. The solid is filtered and washed with water affording 0.353 g. of the title compound, melting point 264°–266° C., dec.

The above reaction proceeds as well using conc. aqueous HCl in place of the saturated ethanolic HCl.

In a similar manner 1 - [1 - (2 - hydroxyethyl) - 5-nitro - 2 - imidazolecarboximidoyl] - 3 - thiosemicarbazide gives 2 - amino - 5 - [1 - (2 - hydroxyethyl) - 5 - nitro - 2-imidazolyl] - 1,3,4 - thiadiazole.

EXAMPLE 18

Preparation of 2-amino-5-(1-ethyl-5-nitro-2-imidazolyl)-1,3,4-thiadiazole

A mixture of 1 - (1 - ethyl - 5 - nitro - 2 - imidazolecarboximidoyl) - 3 - thiosemicarbazide (0.065 g., 0.0025 mole), 10 drops of concentrated hydrochloric acid and 5 ml. of methanol is heated at reflux for 1½ hours. The reaction is diluted with water and made alkaline with concentrated ammonium hydroxide. The solid is filtered, washed and dried, giving 0.049 g. of the title compound, melting point 230°–231° C.

1. A compound of the formula:

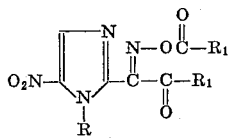

wherein R is a member selected from the group consisting of loweralkyl, loweralkanoyloxyloweralkyl and aroyloxyloweralkyl where aroyl is selected from the group consisting of benzoyl, monohalobenzoyl, dihalobenzoyl, loweralkylbenzoyl, diloweralkylbenzoyl, 4-nitrobenzoyl, methoxybenzoyl and naphthoyl; and $R_1$ is a member selected from the group consisting of phenyl, monohalophenyl, dihalophenyl, loweralkylphenyl, diloweralkylphenyl, 4-nitrophenyl, methoxyphenyl and naphthyl.

2. A compound according to claim 1, where R is loweralkyl.

3. A compound according to claim 1, where R is loweralkanoyloxyloweralkyl.

4. A compound according to claim 1, where R is aroyloxyloweralkyl and aroyl is benzoyl, monohalobenzoyl, dihalobenzoyl, loweralkylbenzoyl, diloweralkylbenzoyl, 4-nitrobenzoyl, methoxybenzoyl or naphthoyl.

5. The compound according to claim 1, 1-benzoyloximino-1-(1-methyl-5-nitro-2-imidazolyl)-2-phenylglyoxal.

6. A method for the preparation of a compound of the formula:

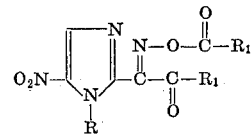

where R is a member selected from the group consisting of loweralkyl, loweralkanoyloxyloweralkyl and aroyloxyloweralkyl, where aroyl is selected from the group consisting of benzoyl, monohalobenzoyl, dihalobenzoyl, loweralkylbenzoyl, diloweralkylbenzoyl, 4-nitrobenzoyl, methoxybenzoyl, and naphthoyl and $R_1$ is selected from the group consisting of phenyl, monohalophenyl, dihalophenyl, loweralkylphenyl, diloweralkylphenyl, 4-nitrophenyl, methoxyphenyl and naphthyl, comprising treating a compound of the formula:

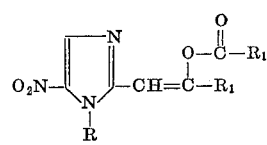

where R and $R_1$ are as described above, with at least 1 mole equivalent of a nitrosating agent selected from the group consisting of nitrosyl chloride, nitrosyl bisulfate, nitrogen dioxide, nitrogen trioxide and nitrogen pentoxide, at a temperature between about 0° C. and 100° C. for from about 10 minutes to 24 hours.

7. A method according to claim 6, wherein the reaction is carried out in the presence of 0.5 to 2 mole equivalents of an alkali metal salt of alkanoic acid at a temperature between about 0° and 100° C. and 1 to 10 mole equivalents of a nitrosating agent is used.

References Cited

UNITED STATES PATENTS 3,472,864   10/1969   Henry et al. _____ 260—309

OTHER REFERENCES

Fournari et al., Bull. Soc. Chim., France 1968, pp. 2438–46.

Kanno, Chem. Abst., vol. 47, cols. 11154–5 (1953).

Touster, Orangic Reactions, vol. VII, pp. 330–43 and 346–8 (1953).

NATALIE TROUSOF, Primary Examiner

U.S. Cl. X.R.

260—240 A, 244 R, 306.8 D, 999